Sept. 27, 1938.  H. C. BEHRENS  2,131,531
GEAR TRANSMISSION
Filed March 16, 1936  4 Sheets-Sheet 1
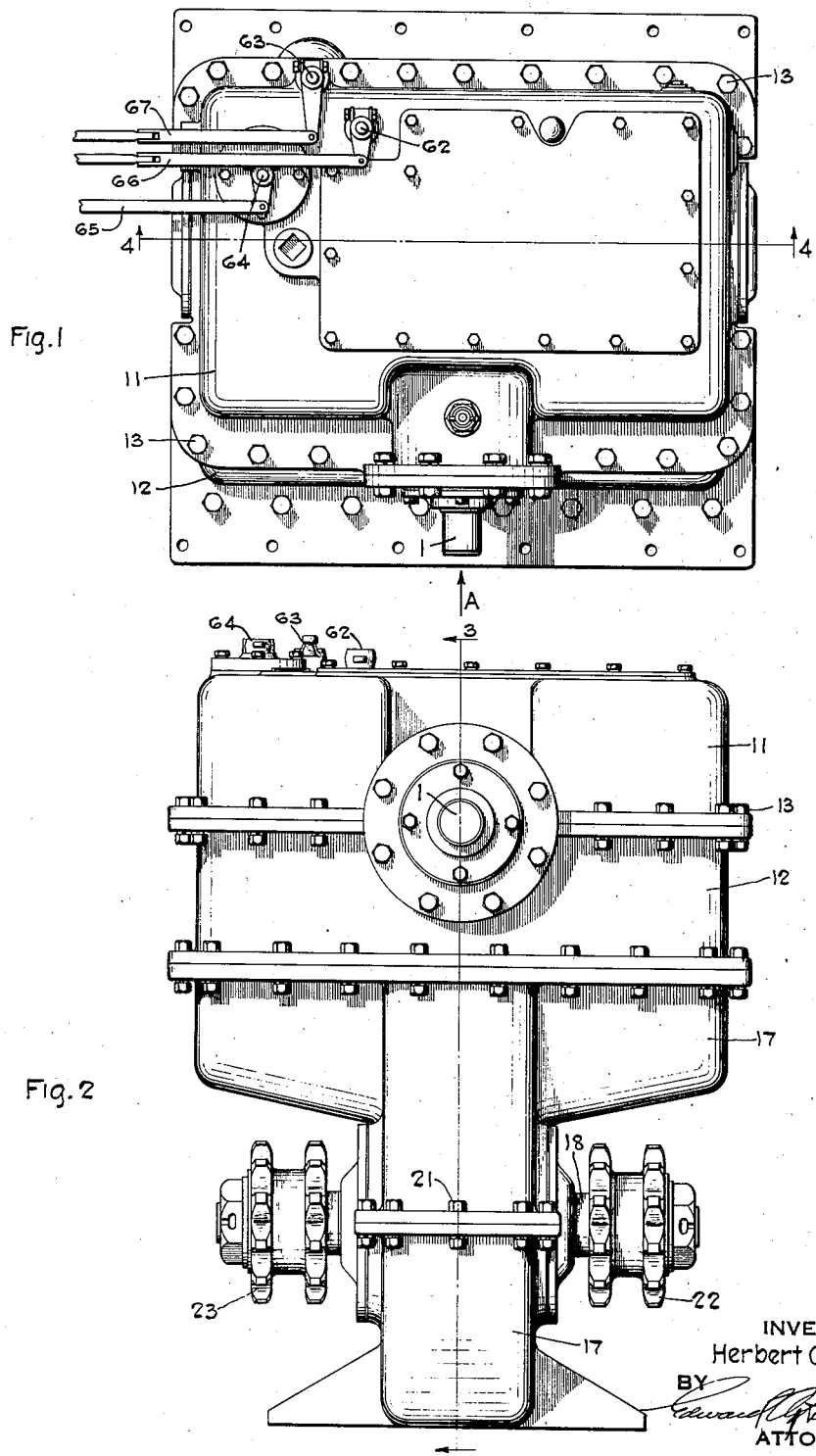
INVENTOR
Herbert C. Behrens
BY
ATTORNEY

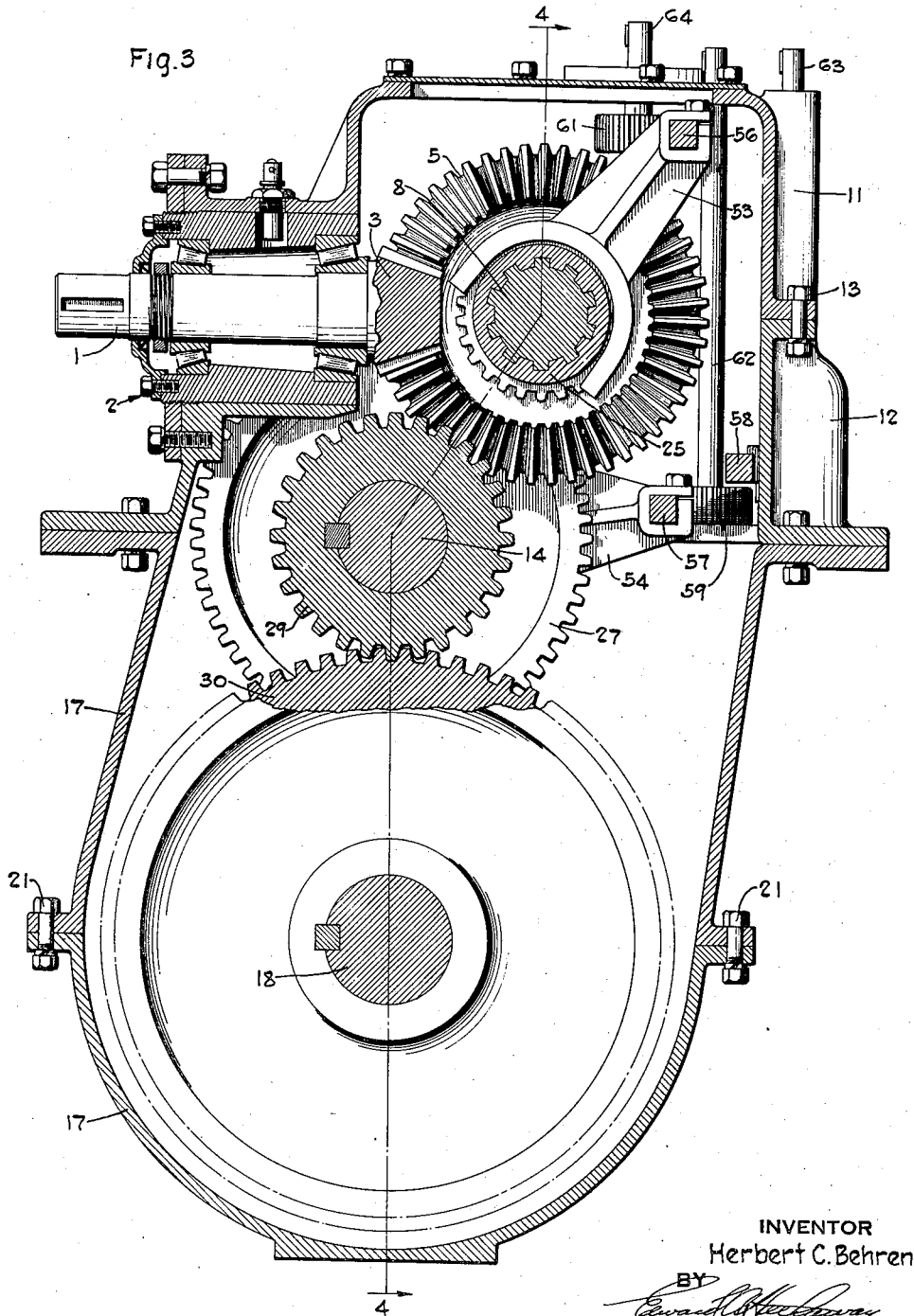

Sept. 27, 1938.  H. C. BEHRENS  2,131,531
GEAR TRANSMISSION
Filed March 16, 1936  4 Sheets-Sheet 4
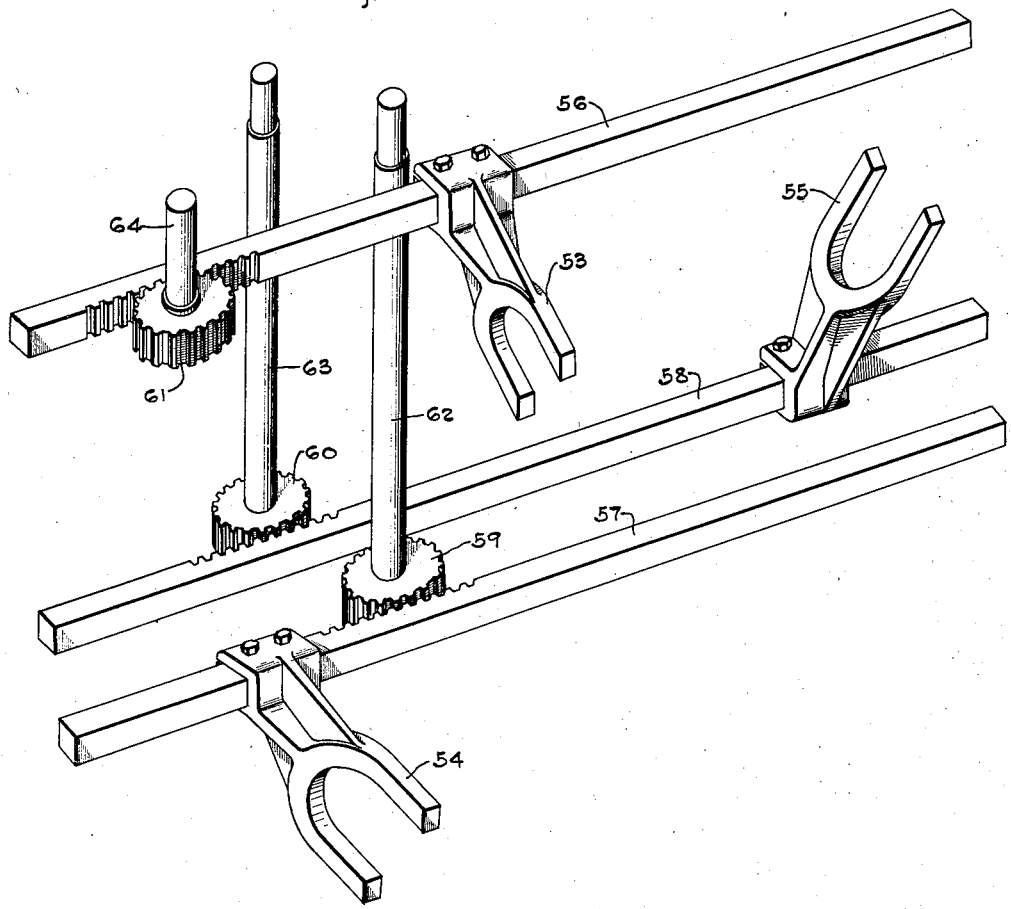
INVENTOR
Herbert C. Behrens
BY
ATTORNEY Patented Sept. 27, 1938

2,131,531

UNITED STATES PATENT OFFICE 2,131,531

GEAR TRANSMISSION

Herbert C. Behrens, Woodlyn, Pa.

Application March 16, 1936, Serial No. 69,178

6 Claims. (Cl. 74—327)

This invention relates generally to speed change gear transmissions and more particularly to one adapted for locomotives of the internal combustion engine type. It is desirable that gear transmissions of internal combustion engine locomotives, particularly for switching service, should be extremely rugged due to the relative large horsepower transmitted and the necessity for shifting gears and letting the clutch in and out with loaded freight cars attached to the locomotive, while at the same time such transmission must be entirely flexible, easy to operate and efficient in the transmission of power as well as being economical in construction and maintenance together with compactness and minimum weight.

It is an object of my invention to provide an improved speed change gear transmission having all of the foregoing desirable qualities together with many speed changes in both forward and reverse. Many transmissions have heretofore been proposed, but the same have been relatively complicated and expensive as well as requiring large space especially where four speed changes for both forward and reverse have been desired.

In the specific embodiment of my invention I am able to accomplish four speed changes in both directions of operation while at the same time presenting an extremely compact and sturdy transmission as well as the other many desirable advantages above mentioned.

Other objects and advantages will be more apparent to those skilled in the art from the following description of the accompanying drawings in which:

Fig. 1 is a plan view of the gear case of my improved transmission;

Fig. 2 is an end elevation viewed in the direction of arrow A, Fig. 1;

Fig. 3 is a vertical longitudinal section taken on the line 3—3 of Fig. 2;

Fig. 5 is a perspective of my improved arrangement of gear shifting mechanism.

Figure 4:
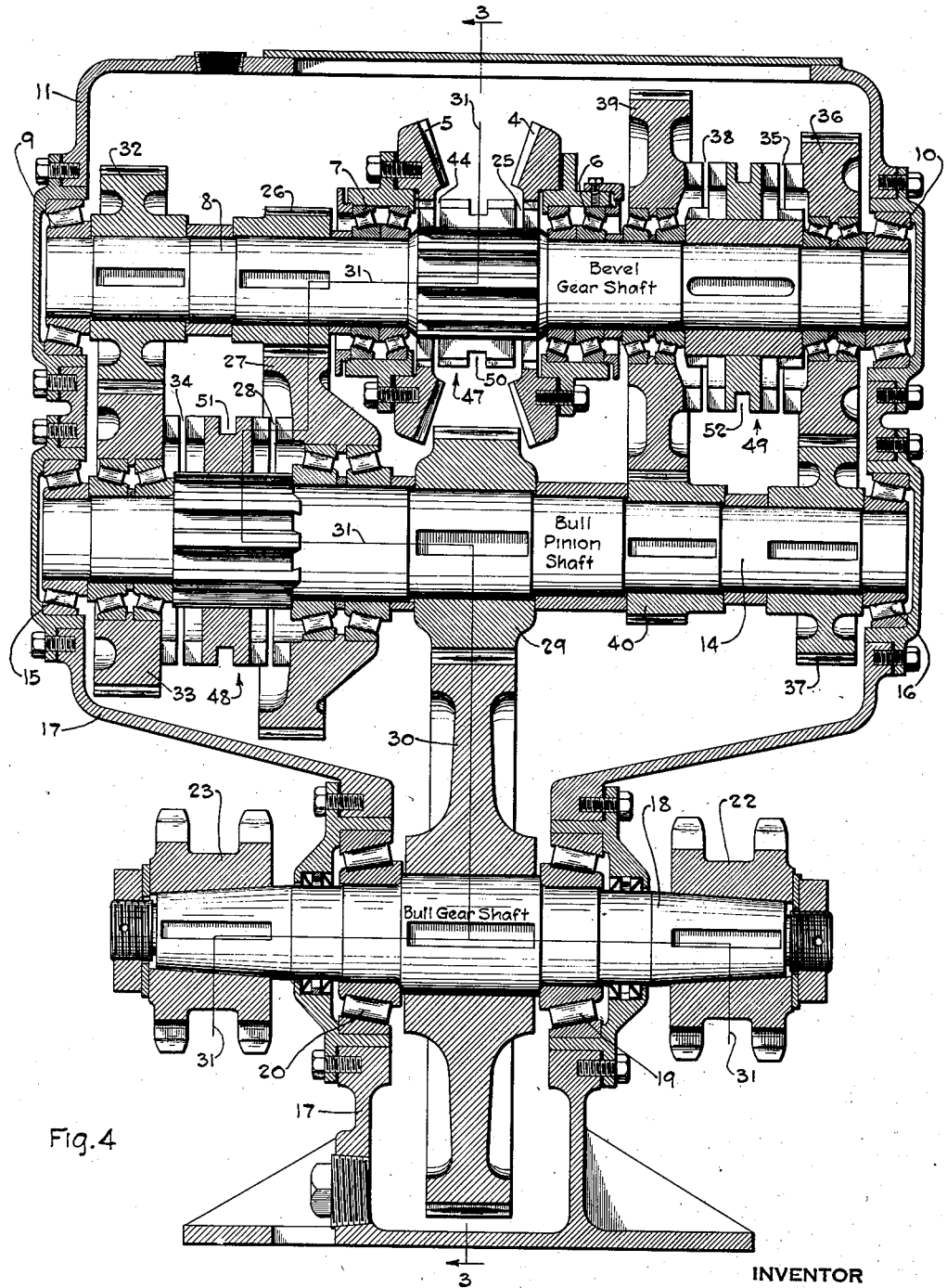
Fig. 4 is a vertical transverse section taken substantially on the line 4—4 of Figs. 1 and 3.

In the particular embodiment of the invention which is disclosed herein merely for the purpose of illustrating one specific form among possible others that the invention might take in practice, I have shown in Fig. 3 a longitudinal driving shaft 1 adapted to be connected by any suitable clutch or other driving mechanism to an engine. This shaft is journalled in a suitable adjustable bearing support 2. A bevel pinion 3, secured to driving shaft 1, has (Fig. 4) constant mesh with forward and reverse bevel gears 4 and 5 respectively freely journalled as by bearings 6 and 7 on a transverse shaft 8. This shaft is suitably journalled in bearings 9 and 10 between upper and intermediate gear case sections 11 and 12 (Fig. 2), the sections being secured together by bolted flanges 13. A transverse bull pinion shaft 14 (Fig. 4) is also journalled in suitable bearings 15 and 16 disposed between intermediate casing section 12 and a lower section 17 (Fig. 2). A bull gear shaft 18 is journalled in bearings 19 and 20 between the split portion of the lower casing 17, the two portions having flanges bolted together as at 21. This part of the casing is relatively narrow so that the driving sprockets 22 and 23 lie beneath the upper main body portion of the gear case.

The remaining structure and arrangement of gears will be more readily understood by tracing the respective gear trains.

*First speed.*—Power is transmitted from pinion 3 through bevel gear 4, clutch 25, shaft 8, gear 26 keyed thereto, gear 27 normally freely journalled on shaft 14, clutch 28 splined to shaft 14 and thence to bull pinion 29 and bull gear 30 to shaft 18. This gear train is indicated by the full line 31.

*Second speed.*—Power flows through pinion 3, gear 4, clutch 25, shaft 8, gear 32 keyed thereto, gear 33 freely journalled on shaft 14 and adapted to be connected thereto through a clutch 34 slidably splined to said shaft and thence through pinion 29 and gear 30 to the sprocket shaft 18.

*Third speed.*—Power flows from pinion 3, gear 4, clutch 25, shaft 8, clutch 35 slidably keyed to shaft 8, gear 36 normally freely journalled on said shaft, and gear 37 to shaft 14 and thence to the sprocket shaft.

*Fourth speed.*—Power is transmitted from the bevel pinion 3 and gear 4 to shaft 8, clutch 38 to a gear 39 freely journalled on said shaft and then through a gear 40 to shaft 14 and on to a sprocket shaft 18.

To effect reverse operation in each of the above speeds, clutch 25 is disengaged and a clutch 44 (Fig. 4) engaged to connect shaft 8 to bevel gear 5. All of the various clutches described herein are of the positive tooth type having a common shiftable body member formed with clutch teeth on each end so that one movement causes one gear to be disengaged and the other gear engaged with a neutral position in which both gears are disengaged.

The compactness of my improved transmission is obtained not only by the general arrangement above disclosed but also by having the clutches 35 and 38 associated with gears 36 and 39 at one end of shaft 8 while clutches 28 and 34 are associated with gears 27 and 33 at the other end of shaft 14.

The manner in which the foregoing arrangement is further conducive to compactness and simplicity of construction and operation is shown by my improved shifting mechanism for the various clutches. Each clutch body generally indicated at 47 for the reversing clutch, 48 for the first and second speed clutches and 49 for the third and fourth speed clutches is provided with annular grooves 50, 51 and 52 respectively receiving (Fig. 5) clutch shipper yokes 53, 54 and 55. Each of these shippers is mounted respectively on and secured to transversely shiftable rods 56, 57 and 58 suitably slidably supported in the gear casing. The relative position of the transverse rods with respect to the gears is shown in Fig. 3, thus showing the accessibility of these parts and the simplicity with which they may be operated by rack and pinions 59, 60 and 61. The shafts 62, 63 and 64 for each of these pinions extend upwardly through the top of the gear box as shown in Figs. 1 and 3. Any suitable operating links 65, 66 and 67 are connected to arms secured to the respective pinion shafts.

Thus it is seen that an extremely efficient, flexible and yet highly sturdy and compact device is provided, one that is economical in construction and maintenance as well as requiring minimum space for four speeds both in forward and reverse.

It will of course be understood that various changes in details of construction and arrangement of parts may be made by those skilled in the art without departing from the spirit of the invention as set forth in the appended claims.

I claim:

1. A gear transmission comprising, in combination, a casing, a longitudinal driving shaft with bevel pinion, a transverse shaft having a pair of freely journalled bevel gears thereon constantly meshing with said bevel pinion, a clutch for alternatively connecting said bevel gears to said transverse shaft, a transverse bull pinion shaft located beneath and to one side of said bevel gear shaft, gearing directly connecting said transverse shafts, a bull gear shaft located substantially directly beneath said bull pinion shaft, and a transverse clutch shifting shaft located beneath said bevel gear shaft in substantially the horizontal plane of said bull pinion shaft.

2. A gear transmission comprising, in combination, a casing, a longitudinal driving shaft with bevel pinion, a transverse shaft having a pair of freely journalled bevel gears thereon constantly meshing with said bevel pinion, a clutch for alternatively connecting said bevel gears to said transverse shaft, a transverse bull pinion shaft located beneath and to one side of said bevel gear shaft, gearing directly connecting said transverse shafts, a bull gear shaft located substantially directly beneath said bull pinion shaft, and a pair of transverse clutch shifting shafts located beneath said bevel gear shaft in substantially the plane of said bull pinion shaft.

3. A gear transmission comprising, in combination, a casing, a longitudinal driving shaft with bevel pinion, a transverse shaft having a pair of freely journalled bevel gears thereon constantly meshing with said bevel pinion, a clutch for alternatively connecting said bevel gears to said transverse shaft, a transverse bull pinion shaft located beneath and to one side of said bevel gear shaft, gearing directly connecting said transverse shafts, a bull gear shaft located substantially directly beneath said bull pinion shaft, and a plurality of transverse clutch shifting shafts certain of which are located beneath said bevel gear shaft and another of which is located above said shaft.

4. A gear transmission comprising, in combination, a casing, a longitudinal driving shaft with bevel pinion, a transverse shaft having a pair of freely journalled bevel gears thereon constantly meshing with said bevel pinion, a clutch for alternatively connecting said bevel gears to said transverse shaft, a transverse bull pinion shaft located beneath and to one side of said bevel gear shaft, gearing directly connecting said transverse shafts, a bull gear shaft located substantially directly beneath said bull pinion shaft, a plurality of transverse clutch shifting shafts certain of which are located beneath said bevel gear shaft and another of which is located above said shaft, and means for transversely moving said clutch shifting shafts including rack and pinions and vertical pinion shafts.

5. A gear transmission comprising, in combination, a casing, a longitudinal driving shaft with bevel pinion, a transverse shaft having a pair of freely journalled bevel gears thereon constantly meshing with said bevel pinion, a clutch for alternatively connecting said bevel gears to said transverse shaft, a transverse bull pinion shaft located beneath and to one side of said bevel gear shaft, gearing directly connecting said transverse shafts, a bull gear shaft located substantially directly beneath said bull pinion shaft, a plurality of transverse clutch shifting shafts certain of which are located beneath said bevel gear shaft and another of which is located above said shaft, and means for transversely moving said clutch shifting shafts including rack and pinions and vertical pinion shafts extending through the top of said casing.

6. A gear transmission comprising, in combination, a casing, a longitudinal driving shaft having a bevel pinion, a transverse shaft having a pair of bevel gears freely journalled thereon and constantly meshing with said bevel pinion, a clutch for alternatively connecting said bevel gears to said transverse shaft, a transverse rod located above said bevel gear shaft and provided with a shipper yoke projecting downwardly for operating said clutch, a pair of speed change gears journalled on said bevel gear shaft, a clutch for alternatively connecting said speed change gears to their shaft, a clutch shifting rod disposed beneath the plane of said bevel gear shaft and provided with a clutch shipper yoke extending upwardly to said latter clutch, a transverse bull pinion shaft having gears fixed thereto and meshing with said speed change gears on said bevel gear shaft, another pair of speed change gears journalled on said bull pinion shaft and meshing with another pair of gears fixed to said bevel gear shaft, a clutch for alternatively connecting said latter journalled speed change gears, a transverse clutch shifting rod having a shipper yoke extending substantially horizontally for operating said last named clutch, and a bull shaft having a gear meshing with a pinion on said bull pinion shaft.

HERBERT C. BEHRENS.